(12) United States Patent
Sharma et al.

(10) Patent No.: US 7,617,486 B2
(45) Date of Patent: *Nov. 10, 2009

(54) METHOD AND SYSTEM TO AUTOMATE SOFTWARE TESTING USING SNIFFER SIDE AND BROWSER SIDE RECORDING AND A TOOLBAR INTERFACE

(75) Inventors: Anoop Sharma, Union City, CA (US); Ramu Korlipara, Union City, CA (US); Binh Nguyen, San Jose, CA (US)

(73) Assignee: eBay, Inc., San Jose, CA (US)

( * ) Notice: Subject to any disclaimer, the term of this patent is extended or adjusted under 35 U.S.C. 154(b) by 1024 days.

This patent is subject to a terminal disclaimer.

(21) Appl. No.: 10/969,736

(22) Filed: Oct. 19, 2004

(65) Prior Publication Data
US 2006/0101403 A1 May 11, 2006

(51) Int. Cl.
*G06F 9/44* (2006.01)
(52) U.S. Cl. ...................................................... 717/125
(58) Field of Classification Search ................. 717/124, 717/125; 434/155, 323; 714/46; 707/4, 707/101; 709/218, 220; 704/270.1
See application file for complete search history.

(56) References Cited

U.S. PATENT DOCUMENTS 6,549,944 B1 * 4/2003 Weinberg et al. ........... 709/224
7,313,564 B2 * 12/2007 Melamed et al. ............ 707/101
2004/0172253 A1 * 9/2004 Singh ....................... 704/270.1
2006/0085132 A1    4/2006 Sharma et al.

* cited by examiner

*Primary Examiner*—Tuan Anh Vu
(74) *Attorney, Agent, or Firm*—Schwegman, Lundberg & Woessner, P.A.

(57) ABSTRACT

A method and system to automate software testing using sniffer side and browser side recording and a toolbar interface are described. In one embodiment, a system tests programming code associated with a website and creates a first test case. In another embodiment, the system includes a testing device having a test interface to enable a user to initiate a first test case and to store a first HTML representation and a first XML representation of encrypted web pages viewed during the first test case. In another embodiment, the system includes a sniffer server that operates as a proxy server for the website and stores a second HTML representation and a second XML representation of unencrypted web pages viewed during the first test case. The system may include a hosting server that hosts the website and receives the first and the second HTML and XML representations from the testing device and the sniffer server when the test case is terminated via the test interface.

8 Claims, 14 Drawing Sheets

QA ACE

BACK | FORWARD | RELOAD | STOP

ADDRESS: http://www.fmvrk.com/reports/aceframe.html | Go (Record) (Analysis) (Reports)

Automation Status | priority | | Auto ID | | Filter

T12345-F12345-MyFeature-ACE_Training-1st(TC27400)

| Step ID | Step Order | Test Case Name | Description | Expected | Priority | Automated | Auto ID | Automate/Modify | Delete |
|---|---|---|---|---|---|---|---|---|---|
| 2 | 1 | My 1st Test | Whg titi oho | dfg | 2-high | | | A/M | |
| 12 | 11 | Test 11 | Af jehdi kk | dgfdshg | 3-low | | | A/M | |
| 8 | 12 | My Test 2 | Dftb hgf d fd | ngfd | 3-med | | | A/M | |
| 7 | 13 | My Test 3 | Vddff fff | fbn | 2-low | | | A/M | |
| 9 | 14 | Test 4 | 1245-ghg | 1nbg | | | | A/M | |
| 5 | 15 | Test 5 | Lgy ugi u | chmh | 1-high | Yes-ldsfiug | 856 | A/M | D |
| 6 | 16 | Test 6 | Tguk iuyg | jvx | 3-med | Yes-bfgfxn | 539875 | A/M | D |
| 4 | 17 | Test 7 | Ovuoi liyg | xfj | | Yes-mbfs | 652526 | A/M | D |
| 3 | 18 | My Test 8 | 6468459-B | ngfx | | Yes-xfgn | 3568 | A/M | D |
| 11 | 19 | Test 10 | 111 | gnfx | 2-med | Yes-hgdfj | 3653 | A/M | D |

V3 Whitebox Regression Testing Sysytem User Cloning

BACK | FORWARD | RELOAD | STOP

ADDRESS: http://sdfhg.gfd/testcaseeditor/testcaserecorder | Go

V3 Whitebox Regression Testing Sysytem
User Cloning

Please clone users that are frequently used in the test plan before recording. Please try the user creation utility. Otherwise, please continue to skip cloning and start automating you test.

Clone User | Continue

Please click here to check whether user ID id taken

| User ID | New User ID | | |
|---------|-------------|---|---|
| User #1: | | ○ Normal  ○ With Acct Info | |
| | | Comment | |
| User #2: | | ○ Normal  ○ With Acct Info | |
| | | Comment | |
| User #3: | | ○ Normal  ○ With Acct Info | |
| | | Comment | |

Clone User | Continue

METHOD AND SYSTEM TO AUTOMATE SOFTWARE TESTING USING SNIFFER SIDE AND BROWSER SIDE RECORDING AND A TOOLBAR INTERFACE

FIELD OF THE INVENTION

Exemplary embodiments of the present invention relate generally to the technical field of software testing automation and, in one exemplary embodiment, to methods and systems to automate the testing of websites using sniffer side and browser side recording and a toolbar interface.

BACKGROUND OF THE INVENTION

Websites have become increasingly complex venues for commerce (e.g., the buying and selling of goods and services over the Internet) and now include interactive functionality and sophistication that allows communication between users and a variety of databases. As such, it has become increasingly difficult to manage transitions from one software revision of a website to another software revision of the website without the use of engineers that test quality and stability of the website prior to release. Often times, testing a portion of a website affects operations within a remainder of the website because changing parameters and variables of the portion may affect the input variables of the remainder (e.g., new code can sometime break old functionality because files being changed have input and output parameters that affect the stability of the remainder). Furthermore, multiple engineers may work on the same portion of software code and a particular engineer may inadvertently modify a parameter that will affect the stability of the remainder (e.g., an engineering team may be focused on solving one problem, and may inadvertently create new problems by changing parameters that are required by another portion of software code associated with the website).

Technology to aid testing of software revisions of websites has largely been limited to external testing tools that require an engineering team to learn a special programming language to define what aspects of the website will be tested (e.g., SILKCENTRAL™ Test Manager by Segue Software, Inc., and MERCURY WINRUNNER™ by Mercury Interactive, Inc.), and internally developed testing systems that are dependent upon manually testing all aspects of a software revision prior to release. External testing tools require that a website owner hire specialized engineers that are trained in specialized programming languages associated with the external tools. Furthermore, external tools cannot test aspects (e.g., physical locations of images, text, or input boxes on a web page) of a software revision that have not been hard coded as candidates for testing (e.g., an engineer must predetermine which aspects of a website are to be tested and hard code instructions for testing the predetermined aspects). Manual offline testing systems are error prone because engineers may not be able to test all aspects of a software revision prior to release (e.g., engineers may make a mistake, or may not have the manpower needed to test every aspect of a website). Furthermore, website owners must hire and maintain an extensive staff of engineers whose sole responsibility is to manually test various operations of a website prior to release of a software revision.

In order to make software testing systems more efficient, there is some incentive for operators to provide systems for automating the testing of software revisions associated with websites without the use of external testing tools that require hard coding of testing candidates, and without hiring specialized engineers that are trained in specialized programming languages associated with the external tools. However, the design of such software testing systems presents a number of technical challenges, specifically relating to which data is examined, how data is recorded, how accuracy is maintained, and how hardware architecture is designed and/or implemented to manage automated software testing systems.

SUMMARY OF THE INVENTION

A method and system to automate software testing using sniffer side and browser side recording and a toolbar interface is provided. In one aspect, a system to test programming code associated with a website and to create a first test case is provided. In one aspect, the system includes a testing device having a test interface to enable a user to initiate a first test case and to store a first HTML representation and a first XML representation of encrypted web pages viewed during the first test case. In another aspect, the system includes a sniffer server to operate as a proxy server for the website and to store within a second memory a second HTML representation and a second XML representation of unencrypted web pages viewed during the first test case. In one aspect, the system includes a hosting server to host the website and to receive the first and the second HTML and XML representations from the testing device and the sniffer server when the first test case is terminated via the test interface.

The invention extends to a machine-readable medium storing a set of instructions that, when executed by the machine, cause the machine to perform any one or more of the systems and methods described herein. Other features of the present invention will be apparent from the accompanying drawings and from the detailed description that follows.

BRIEF DESCRIPTION OF THE DRAWINGS

An embodiment of the present invention is illustrated by way of example and not limitation in the figures of the accompanying drawings, in which like references indicate similar elements and in which:

FIG. 7 is a user interface diagram illustrating an exemplary user interface (UI) for initiating a test case within the testing device, according to one exemplary embodiment.

FIG. 8 is a user interface diagram illustrating an exemplary user interface (UI) for reusing user profile information, according to one exemplary embodiment.

DETAILED DESCRIPTION

A method and system to automate software testing using sniffer side and browser side recording and a toolbar interface are described. In one embodiment, a testing module (e.g., a testing application which presents a toolbar interface) may be executed together with a browser application at a testing system (e.g., testing device) connected to a network. In the following description, for purposes of explanation, numerous specific details are set forth in order to provide a thorough understanding of an embodiment of the present invention. It will be evident, however, to one skilled in the art that the present invention may be practiced without these specific details.

Figure 1:
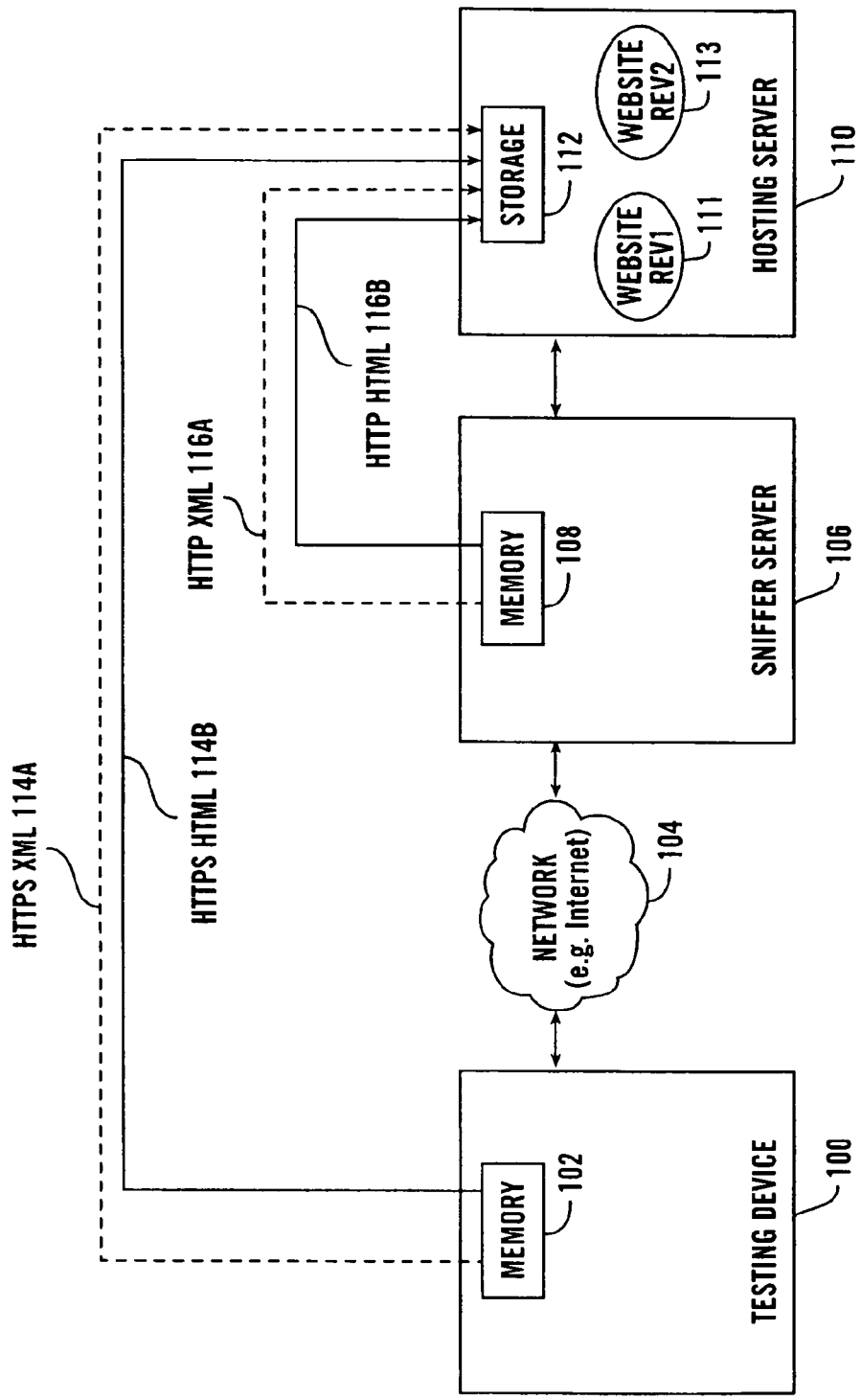
FIG. 1 is a block diagram illustrating a system having a testing device, a sniffer server, and a hosting server to test programming code associated with a website.

FIG. 1 is a block diagram illustrating a system having a testing device 100, a sniffer server 106 that performs a sniffing function (e.g., captures representation data) for unencrypted web pages, and a hosting server 110 to test programming code associated with a website. The testing device 100 communicates with the sniffer server 106 and the hosting server 110 through a network 104. In one embodiment, the network 104 may be the Internet. The testing device 100 includes memory 102. The memory 102 may for example be random access memory or other volatile or nonvolatile memory. An exemplary test case may include a set of operations that define a sequence of actions a user of a website may perform (e.g., a particular test case may include a representation of actions that a typical user would take to bid on an item on a commerce website for example). Testing representations of encrypted web pages associated with a test case for a website (e.g., HTTPS XML 114A and HTTPS HTML 114B) are stored within memory 102 of the testing device 100. (e.g., the memory 102 may store testing representations of encrypted web pages when a user initiates a test case for the website 111). In contrast, testing representations of unencrypted web pages associated with the test case for the website (e.g., HTTP XML 116A and HTTP HTML 116B) are stored within a memory 108 of the sniffer server 106 so that multiple test cases can simultaneously be performed, as will later be described with reference to FIG. 3. In one embodiment, an HTTPS XML representation 114A and an HTTP XML representation 116A includes commands for regenerating the actions (e.g. movements) or operations of the user on the website 111 (e.g., movements of a user may be regenerated when the test case is automatically rerun within testing device 100). The HTTPS HTML representation 114B and HTTP HTML representation 116B may include source code of individual web pages visited within the website 111. It should be noted that the HTTPS XML 114A and HTTPS HTML 114B, as well as the HTTP XML 116A and HTTP HTML 116B may be communicated through network 104. Furthermore, in another embodiment, the sniffer server 106 and/or the testing device 100 stores all XML data required to generate the XML document for both unencrypted and/or encrypted web pages.

Figure 2:
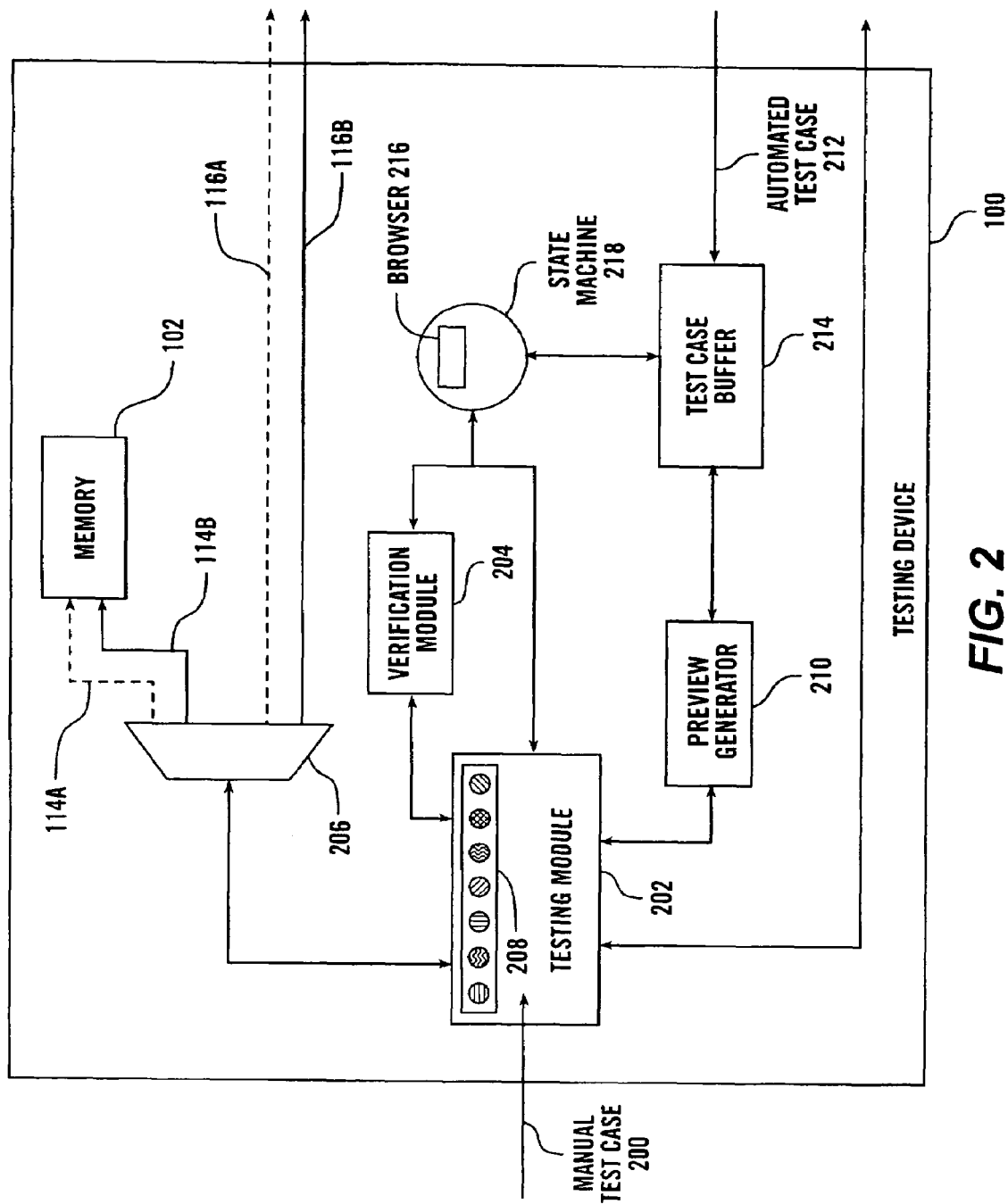
FIG. 2 is a block diagram illustrating a zoom view of the testing device having a toolbar, according to one exemplary embodiment.

FIG. 2 is a block diagram illustrating a zoom view of the testing device 100 having a toolbar interface 208, according to one exemplary embodiment. The testing device 100 includes the testing module 202 (e.g., a stand-alone capture application or a testing application incorporating a capture application) having the toolbar interface 208 (e.g., the toolbar interface may be a test interface that allows a user to test programming code associated with a website), a verification module 204, an output generator 206, a preview generator 210, a test case buffer 214, a state machine 218 having a browser application 216, and memory 102. In one embodiment, the toolbar interface 208 is a user interface to a capture application (e.g., an application which captures operations of a user of a website) within the testing module 202. In another embodiment, the testing module 202 includes a capture application as a subset of a larger and more robust testing application (e.g., a robust testing application may test the integrity of programming code and hardware servers associated with a website). The testing module 202 (e.g., including the capture application) may be executed within a browser 216 or integrated into a browser 216 (e.g., installed as a component in a browser application by a patch and/or update software). A manual test case 200 may be initiated by a user of the testing device 100 (e.g., a quality-assurance engineer) to perform testing of a first version of website 111 as shown in FIG. 1 in one embodiment. The testing module 202 may record operations (e.g., movements) and operations of the user as he/she navigates using a browser application 216 to generate representations (e.g., 114A-114B, and 116A-116B as previously discussed) of the manual test case 200. The testing module 202 may also change proxy settings within the testing device 100 to receive the website 111 from the sniffer server 106 (as shown in FIG. 1) rather than the hosting server 110 to allow for simultaneous testing as will later be described in FIG. 3.

Figure 12:
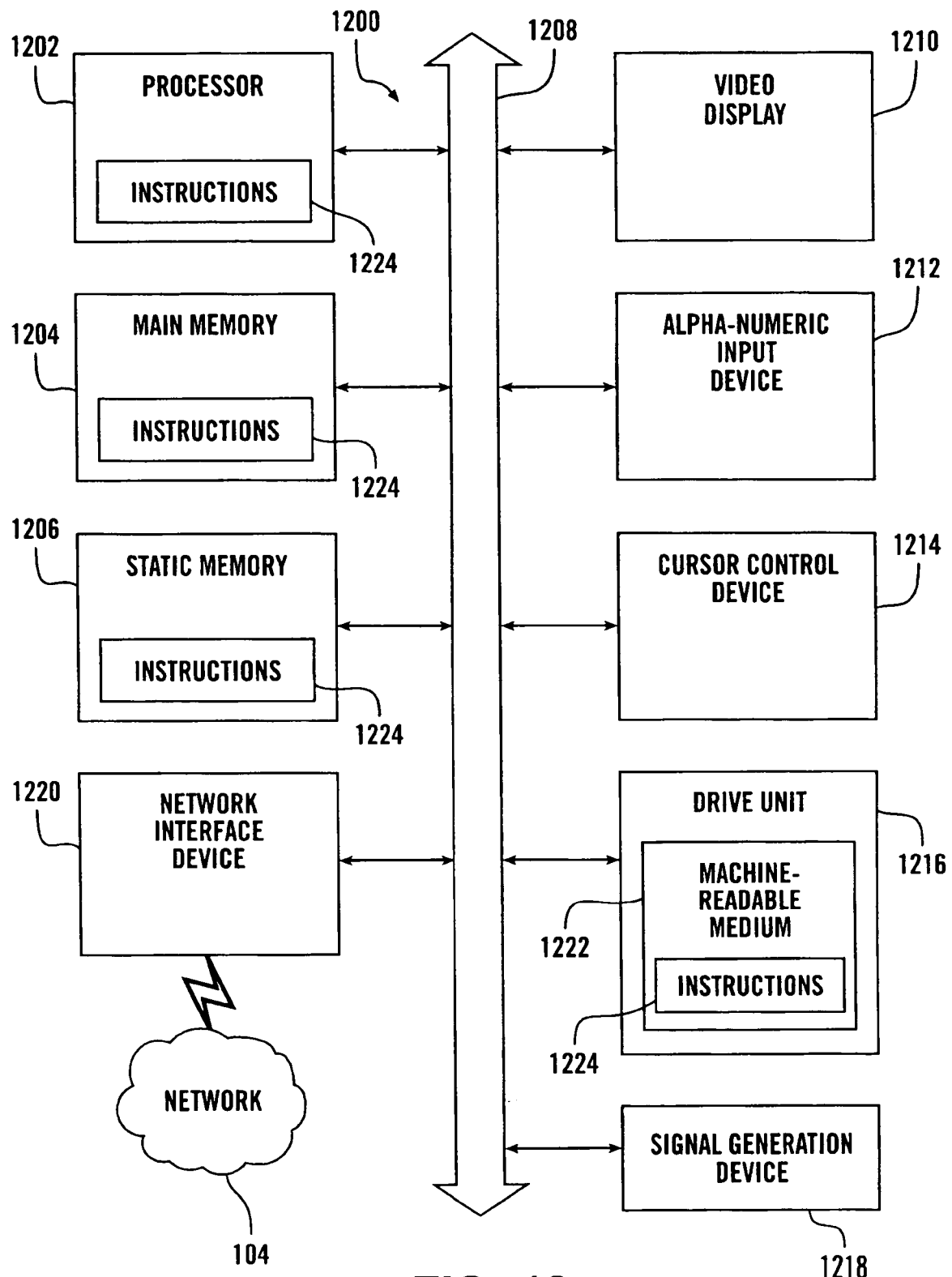
FIG. 12 is a diagrammatic representation of machine in the exemplary form of a computer system, according to one exemplary embodiment.

As noted above, the testing module 202 may include a toolbar interface 208. The toolbar interface 208 may be presented by a browser application 216 within state machine 218. The state machine 218 may be a computer system 1200 as illustrated in FIG. 12. The functions that can be invoked using the toolbar interface 208 will be described later in detail with respect to FIG. 5. The testing module 202 may interact with the verification module 204 if a user selects additional information (e.g., additional keywords or a variable database value that the user wishes to include within the test case) to save within a test case associated with the representations 114A-114B and 116A-116B. In one embodiment, a user might test the functionality of a website by pressing buttons on the toolbar interface 208 within a browser application, as illustrated in FIG. 6. After the movements of a user performing the manual test case 200 are recorded using the testing module 202 (and optionally the verification module 204), the output generator 206 prepares representations of the test case.

The output generator 206 in FIG. 2 divides the representations of encrypted web pages (e.g., HTTPS web pages) and unencrypted web pages (e.g., HTTP web pages) so that encrypted representations 114A and 114B are stored within a memory (e.g., a local memory 102) accessible by the testing device 100, and unencrypted representations 116A and 116B are transferred to a further memory (e.g., a memory 108 within the sniffer server 106) through network 104 (e.g., as illustrated in FIG. 1). The encrypted representation 114A and unencrypted representation 116A may be XML code (e.g., extensible markup language including customized tags, enabling the definition, transmission, validation, and interpretation of data between applications and/or iterations of a test case) for regenerating the operations (e.g., movements) of a user during manual test case 200. The encrypted representation 114B and unencrypted representation 116B may be HTML code that includes source code of individual web pages visited during manual test case 200.

Figure 5:
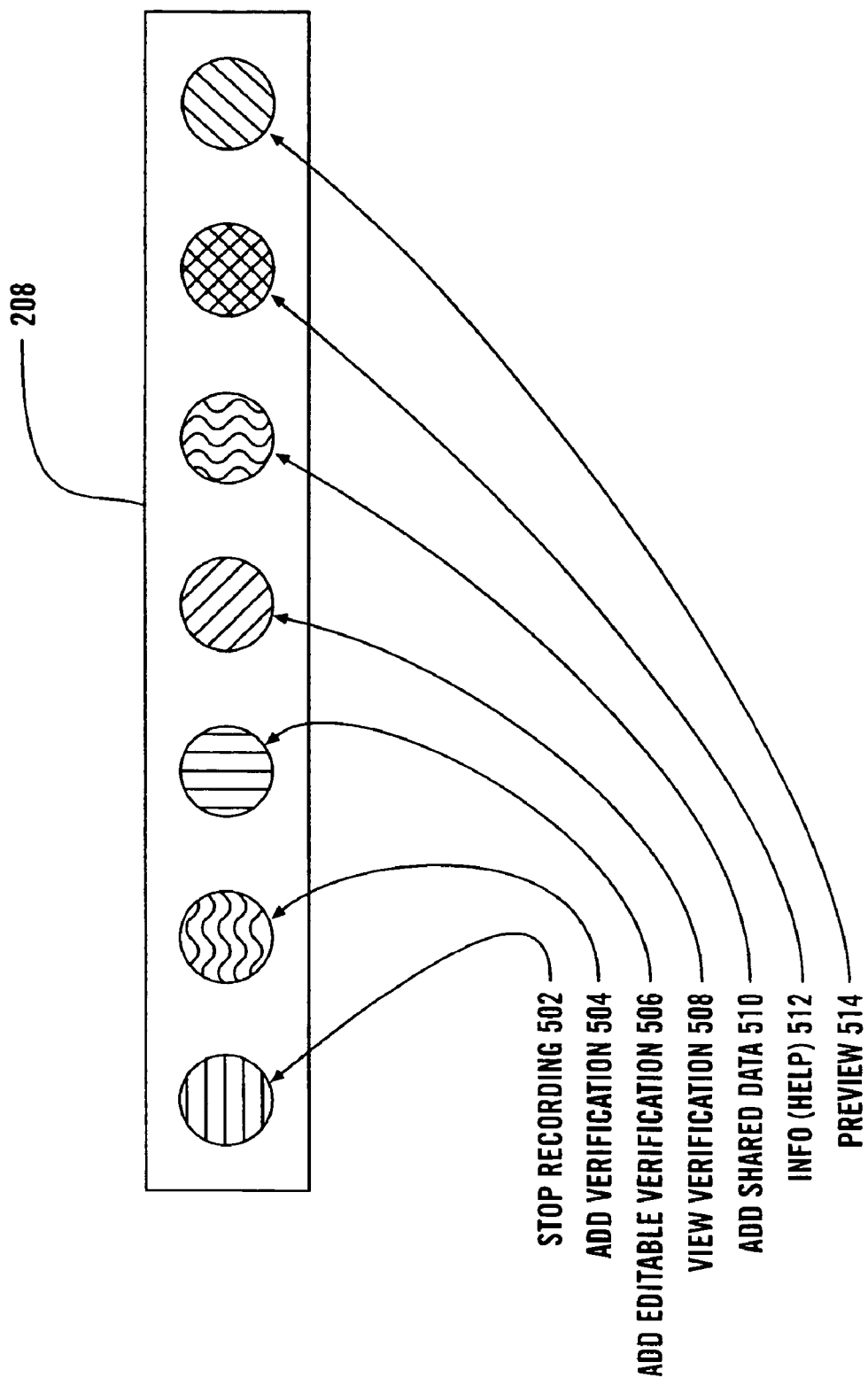
FIG. 5 is a user interface diagram illustrating a functional view of the toolbar, according to one exemplary embodiment.
Figure 6:
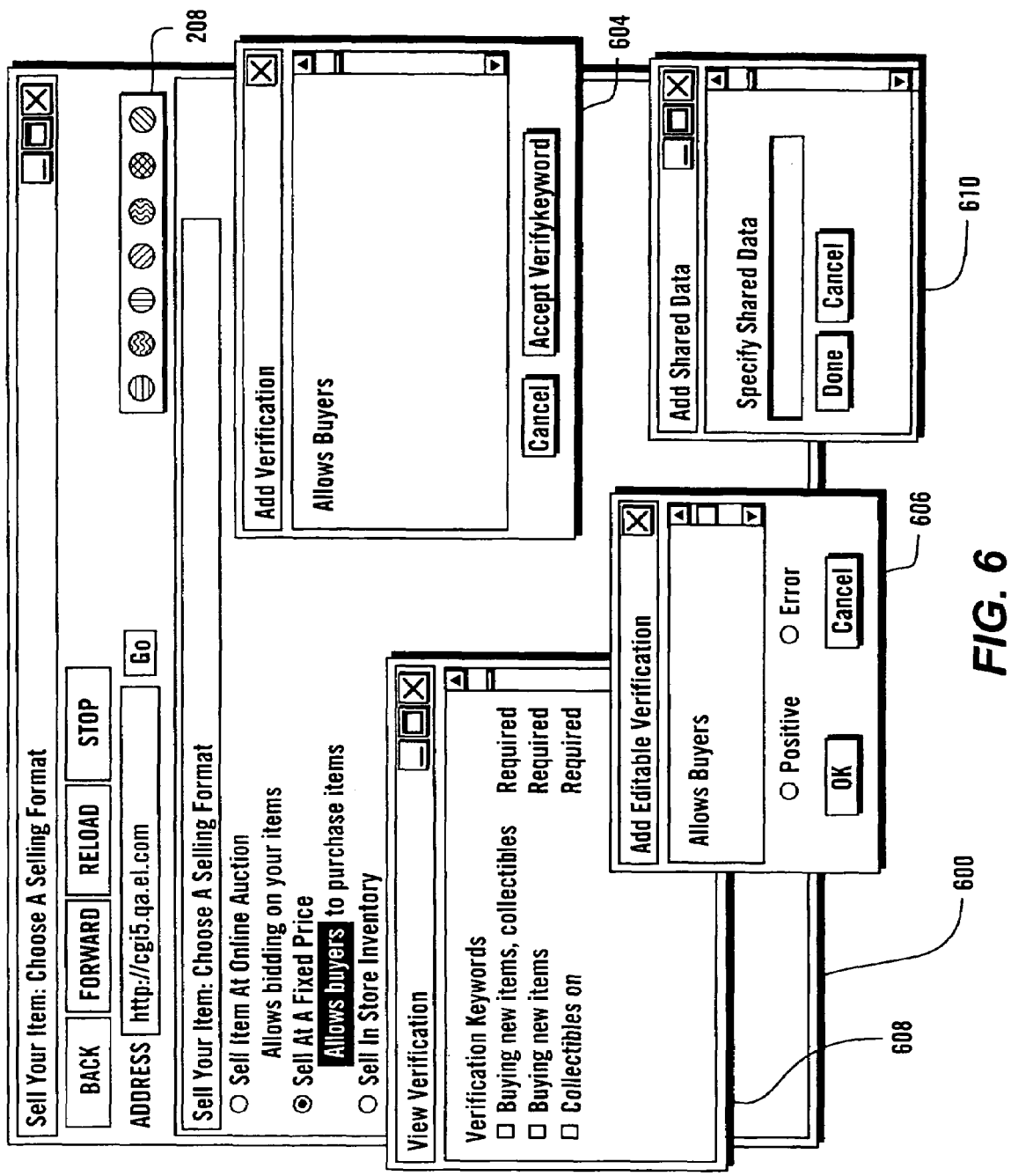
FIG. 6 is a user interface diagram illustrating an exemplary user interface (UI) of an activated toolbar, according to one exemplary embodiment.

In FIG. 2, the toolbar interface 208 of the testing module 202 may include a user selectable indicia or other user-selectable mechanism (e.g., the stop recording button 502 as shown in FIG. 5), which when selected by the user may operate to terminate a recording process, and to transfer the representations 114A-114B and 116A-116B from the testing device 100 and the sniffer server 106 respectively to a storage device 112 within the hosting server 110 (e.g., as illustrated in FIG. 1). Collectively, the representations 114A-114B and 116A-116B of the manual test case 200 may form an automated test case 212 (e.g., a new version of website 111, such as website 113 in FIG. 1 may not require manual entry of a test case by a user). The automated test case 212 may be stored within the storage device 112 within the hosting server 110 as illustrated in FIG. 1. After the manual test case 200 has been performed once, subsequent tests of a website 111 may be performed automatically by running the automated test case 212.

Figure 3:
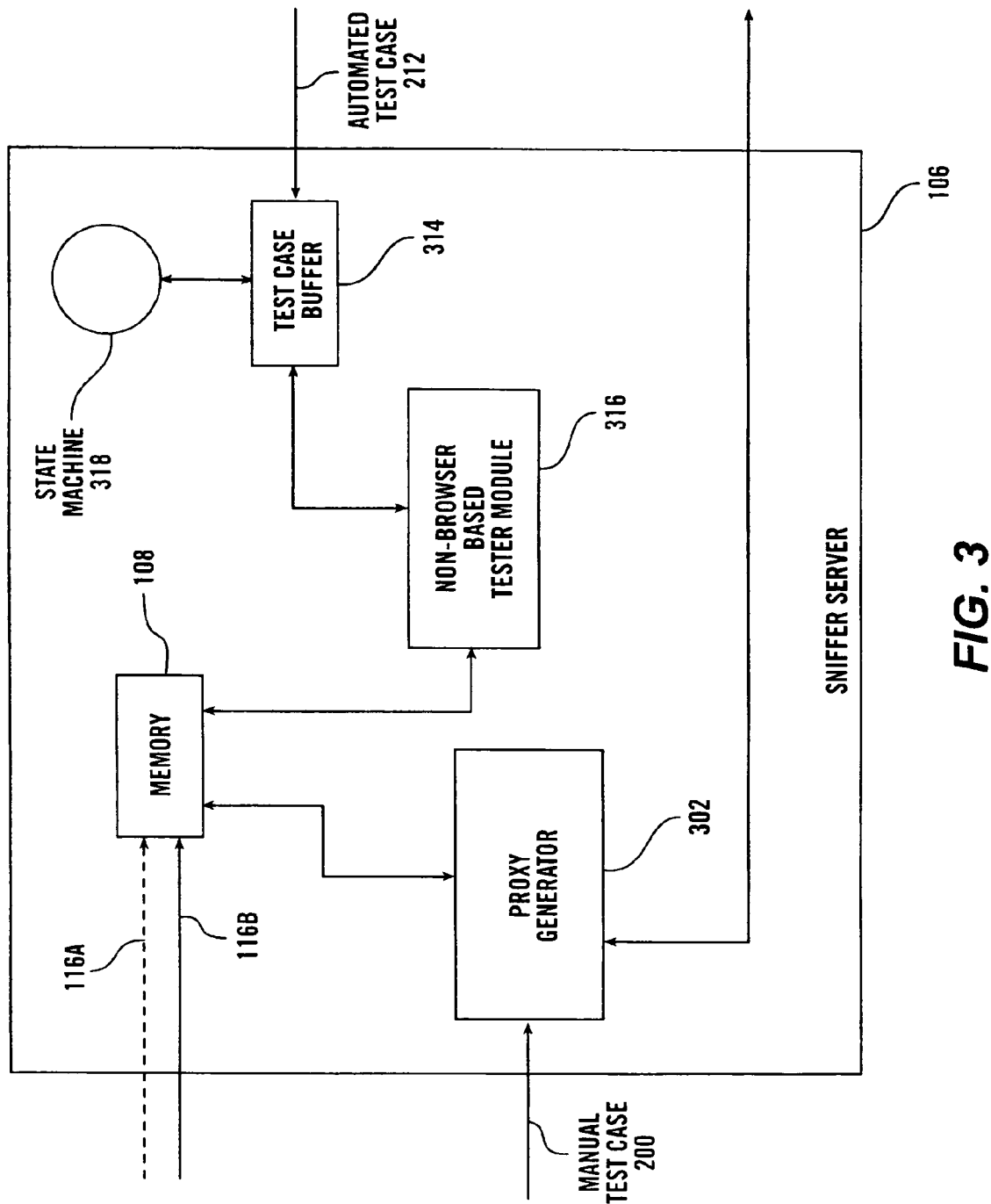
FIG. 3 is a block diagram illustrating a zoom view of the sniffer server, according to one exemplary embodiment.
Figure 10:
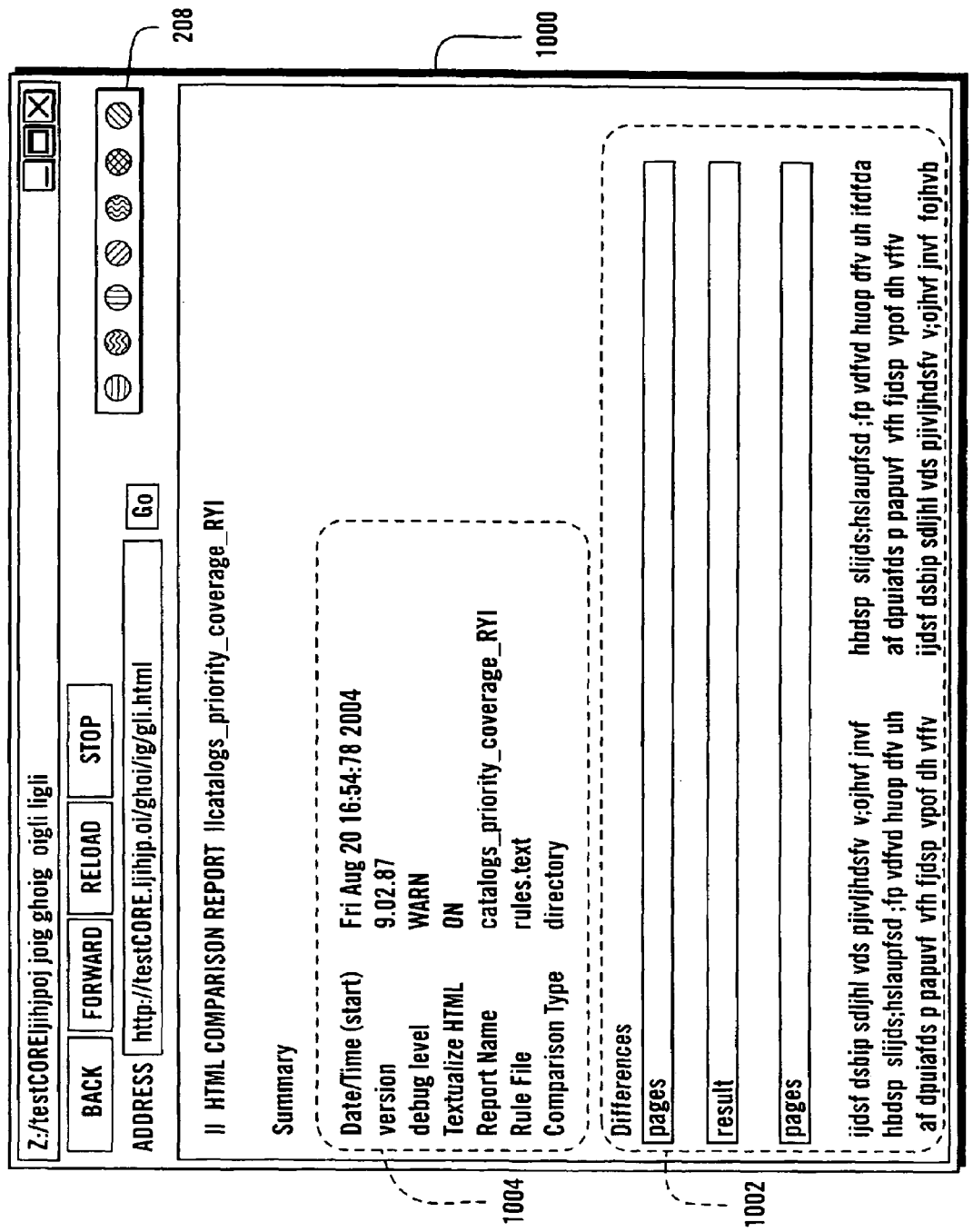
FIG. 10 is a user interface diagram illustrating an exemplary bug report generated by a testing device, according to one exemplary embodiment.
Figure 11:
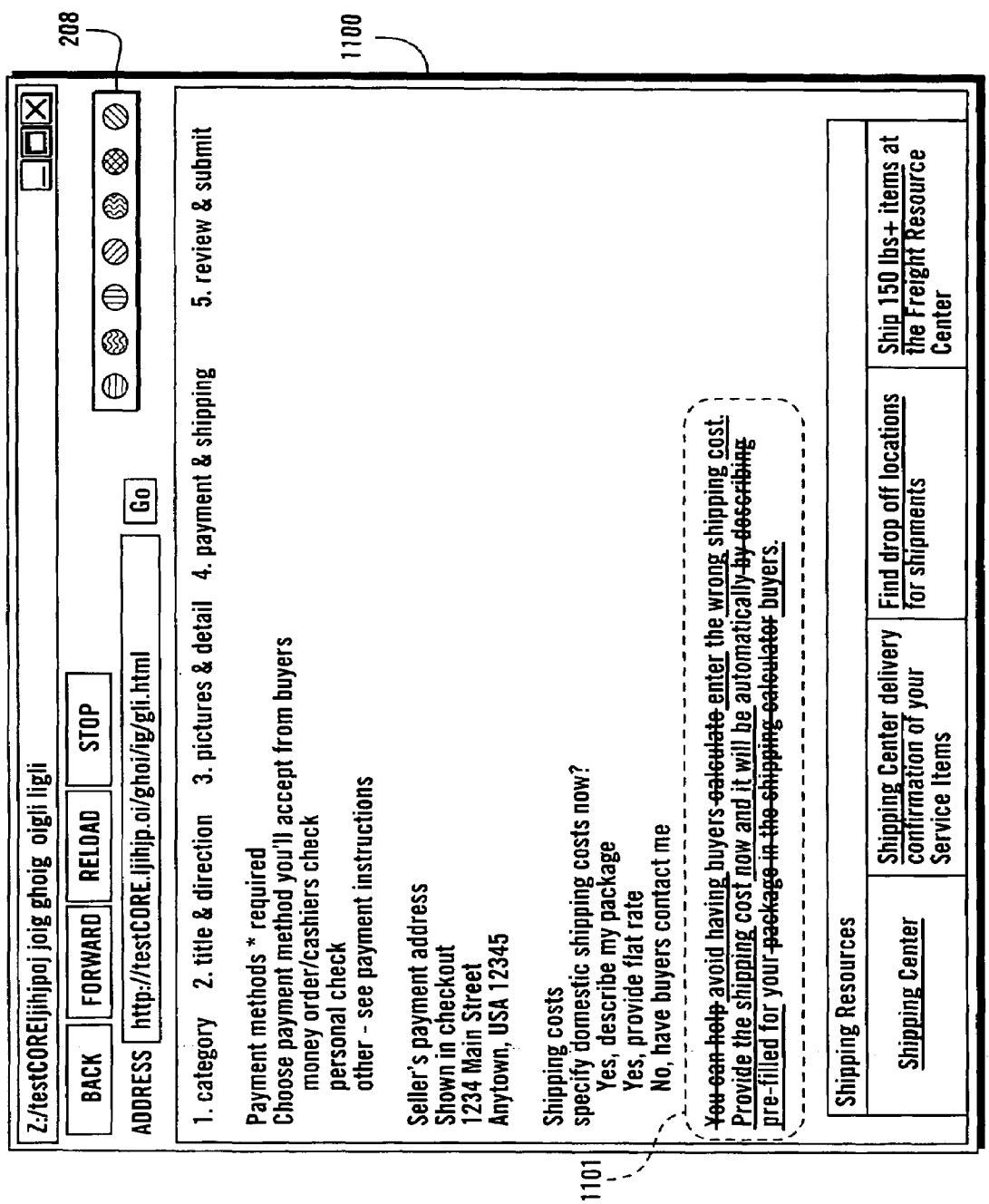
FIG. 11 is a user interface diagram illustrating an exemplary difference view generated by a testing device, according to one exemplary embodiment.

If the automated test case 212 is performed rather than the manual test case 200, the testing device 100 receives the automated test case 212 from the hosting server 110 into a test case buffer 214. The test case buffer 214 may queue one or more automated test cases 212 before utilizing a preview generator 210 within the testing device 100 to automatically perform the automated test case 212. In one embodiment, the preview generator 210 may also be located within the sniffer server 106. In one embodiment, the preview generator 210 may simultaneously preview a plurality of test cases by using a non-browser based tester module 316 within the sniffer server 106 as shown in FIG. 3. In one embodiment, the preview generator 210 may open a browser application 216 within the state machine 218 before performing the automated test case 212. Output generated from the automated test case 212 may include a bug report (e.g., HTML comparison report as shown in FIG. 10) or may indicate a differences view (e.g., differences between the expected representation and the generated representation for each web page within a test case as shown in FIG. 11). The output generator 206 may also operate to generate representations of encrypted and unencrypted web pages visited by a user when the automated test case 212 is performed, as previously described with respect to the manual test case 200.

Returning to FIG. 1, the sniffer server 106 includes a memory 108. Testing representations (e.g., HTTP XML 116A and HTTP XML 116B) are stored within the memory 108 for unencrypted web pages associated with a test case for a website. (e.g., the memory 108 may store testing representations of unencrypted web pages when a user initiates a test case for the website 111). In one embodiment, the memory 102 and the memory 108 may be cache memories within the testing device 100 and the sniffer server 106 respectfully. A zoom view of sniffer server 106 is illustrated in FIG. 3.

In FIG. 3, the sniffer server 106 includes a proxy generator 302, a memory 108, a non-browser based tester module 316, a test case buffer 314 and a state machine 318. The proxy generator 302 may automatically transform the sniffer server 106 into a proxy server between the hosting server 110 and the testing device 100 when the manual test case 200 is performed for a website 111 as previously described in FIG. 2. The proxy generator 302 within the sniffer server 106 may automatically transfer proxy settings to the testing device 100. The memory 108 may receive unencrypted representations (e.g., 116A and 116B) of the manual test case 200 as previously described. Furthermore, the memory 108 may transfer unencrypted representations to storage device 112 within the hosting server 110 if a stop recording button 502 (as shown in FIG. 5) is selected on the toolbar interface 208 within a testing module 202 as shown in FIG. 2.

The sniffer server 106 in FIG. 3 also includes a non-browser based tester module 316. The non-browser based tester module 316 may receive an automated test case 212 through a test case buffer 314. The test case buffer 314 may optionally queue one or more automated test cases 212 before utilizing the non-browser based tester module 316 within the sniffer server 106, in one embodiment (similar to the test case buffer 214 as described in FIG. 2). The non-browser based tester module 316 may utilize memory 108 in performing simultaneous tests of a group of automated test cases in one embodiment. The non-browser based tester module 316 may operate faster than browser based testing (e.g., the browser 216 within the testing device 100 as shown in FIG. 2) because it does not require the overhead code associated with a browser. The non-browser based tester module 316 may include a number of individual testing blocks (not shown) that allow the non-browser based tester module 316 to simultaneously perform automated test cases. The non-browser based tester module 316 may utilize the processing power of the state machine 318, but unlike the state machine 218 as described in FIG. 2, the state machine 318 in FIG. 3 includes no browser application 216. The state machine 318 may be a computer system 1200 as illustrated in FIG. 12. In one embodiment, the non-browser based tester module 316 within the sniffer server 106 may be used to simultaneously preview a plurality of test cases.

Returning to FIG. 1, the hosting server 110 includes storage device 112, a website 111, and a website 113. It should be noted that website 111 and website 113 may be portions of a website (e.g., a flow of web pages and associated application code) rather than an entire websites viewable you a user. The website 113 may be a newer version of website 111. The website 111 and the website 113 may each include a number of encrypted web pages and a number of unencrypted web pages in one embodiment. The website 111 may be a network based trading platform in one embodiment. Other embodiments, the website 111 may include any type of web based content, or web based application. The automated test case 212 for the website 111 as described in FIG. 2 (e.g., in the discussion of testing device 100) may automatically test a portion of programming code that is common between the website 111 and the website 113 in another embodiment. (e.g., an automated test case 212 from a previous website version may be reused to test the common test code in a newer version). In one embodiment, a storage device 112 within the hosting server 110 as illustrated in FIG. 1 (e.g., a hard drive, flash drive, or other type of non-volatile or volatile storage device) may receive representations of encrypted websites (e.g., 114A and 114B) from the testing device 100, and may receive representations of unencrypted websites (e.g., 116A and 116B) from the sniffer server 106 when a test case is saved.

Figure 4:
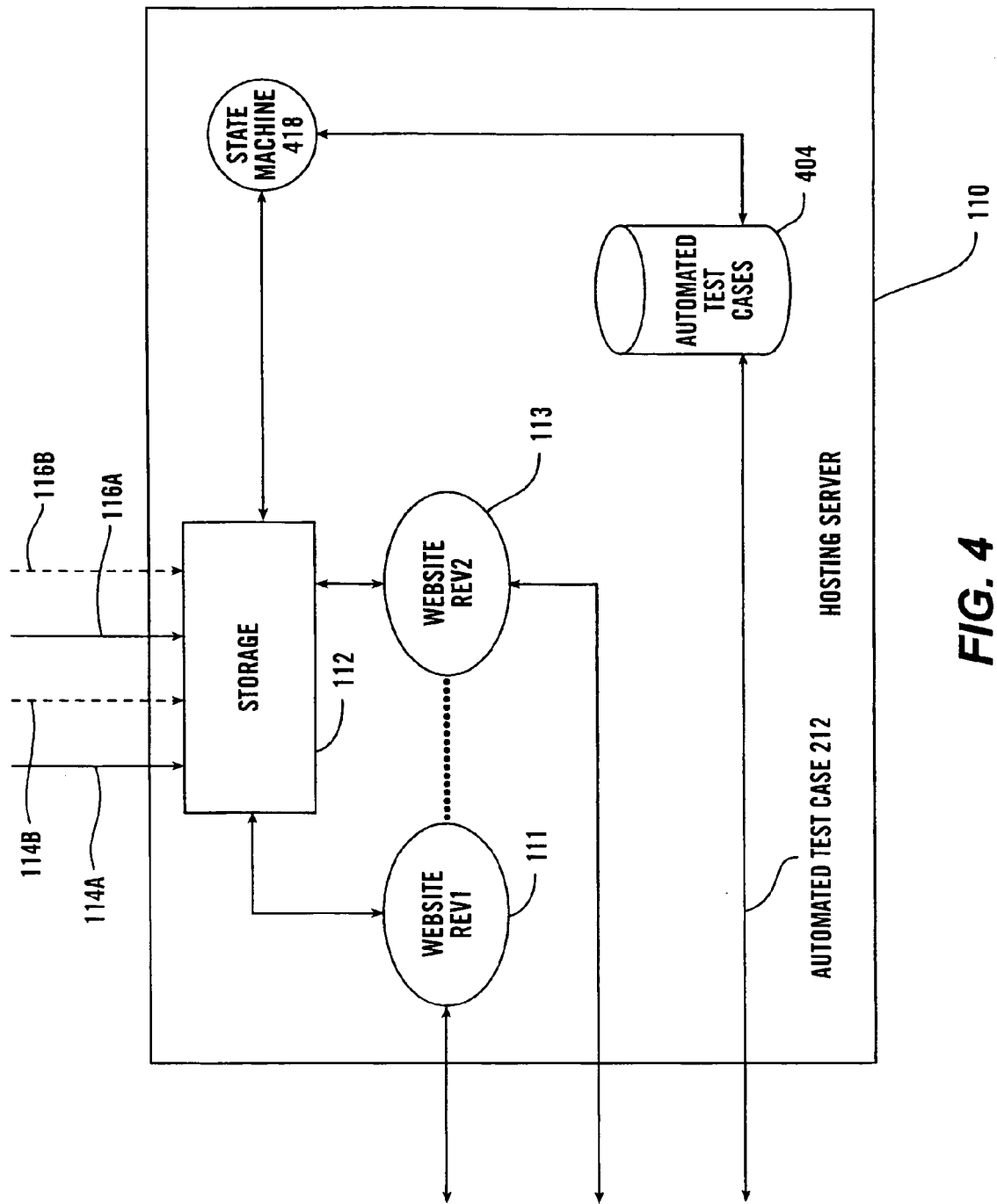
FIG. 4 is a block diagram illustrating a zoom view of the hosting server, according to one exemplary embodiment.

A zoom view of hosting server 110 is illustrated in FIG. 4. The hosting server may include a state machine 418 and an automated test case database 404. The state machine 418 may be a computer system 1200 as illustrated in FIG. 12. The automated test case database 404 may include detailed test results for a plurality of automated test cases that have been previously received and stored within storage device 112 within the hosting server 110 in one embodiment. The state machine 418 may operate to transform the representations received for encrypted web pages (114A and 114B) and representations received for unencrypted web pages (116A and 116B) into automated test cases that are stored within the automated test case database 404 in one embodiment. (e.g., the state machine 418 may process the representations received into the storage device 112 within the hosting server 110 into formats that can be interpreted by the test case buffer 214 and the state machine 218 within the testing device 100 as shown in FIG. 2 and the test case buffer 314 and the state machine 318 within the sniffer server 106 as shown in FIG. 3 to perform automated test case 212).

FIG. 5 illustrates a functional view of the toolbar interface 208 according to one exemplary embodiment. The toolbar interface 208 may be the toolbar interface 208 from which functions provided by the testing module 202 may be invoked as shown in FIG. 2. The toolbar interface 208 allows a user to invoke a number of operations that are illustrated as representative buttons in FIG. 5. In FIG. 5, toolbar interface 208 includes a Stop Recording button 502, an Add Verification button 504, an Add Editable Verification button 506, a View Verification button 508, an Add Shared Data button 510, an Info (Help) button 512, and a Preview button 514. The Stop Recording button 502 terminates the recording of a test case within a testing device 100. The Stop Recording button 502 may trigger the transmission of representations associated with encrypted and unencrypted web pages from the testing device 100 and the sniffer server 106 to the hosting server 110 as previously described in FIGS. 1 and 2.

The Add Verification button 504 allows a user of a testing device 100 to manually highlight a portion of a web page and indicate the portion that has been highlighted as including required text information for future test cases (e.g., as shown in window 604 in FIG. 6). As such, Add Verification 504 may allow a user to hard code in additional candidates for testing by particularly pointing out areas of a web-page that the user wishes to insure are maintained precisely as the expected HTML result. The Add Editable Verification button 506 may be similar to the Add Verification button 504 but provides the user a prompt screen from which to indicate whether and what data should be included in an automated test case irregardless of the actual data currently viewed within the web-page (e.g., as shown in window 606 in FIG. 6). As such, the Add Editable Verification button 506 may allow a user to customize a particular test case so as to allow additional search criteria not represented within the viewable web pages within the test case.

The View Verification button 508 may allow a user to preview what has been manually inputted through the Add Verification and Add Editable Verification buttons 504 and 506 into a particular test case (e.g., as shown in window 608 in FIG. 6). In one embodiment, the Add Verification button 504, the Add Editable Verification button 506 and the View Verification button 508 each invoke functions of the Verification Module 204 as illustrated in FIG. 2 within the testing device 100. The Add Shared Data button 510 may allow a user to define a filter area (e.g., by highlighting a portion of a web page) and instruct a particular test case (e.g., a particular test case may include a representation of actions that a typical user would take to bid on an item on a commerce website for example) to ignore certain data fields or content within certain data fields within the filter area of a web page (e.g., as shown in window 610 in FIG. 6). For example, the Add Shared Data button 510 may indicate that a particular screen area of a web-page contains dynamic content that can change and should be ignored by the test case in future iterations because the dynamic content does not indicate an error in programming code, but rather implements a feature of the particular website being tested (e.g., a feature such as showing a user's name, current temperature, date and time, etc.).

The Info (Help) button 512 allows a user to get help about how to operate the toolbar interface 208 within a browser. The Preview button 514 may allow a user to view contents of a particular test case and replay the test case without manual entry. In one embodiment, the Preview button 514 may trigger a Non-Browser Based Tester Module 316 within the sniffer server to simultaneously test a plurality of test cases. In another embodiment, the Preview button may trigger the preview generator 210 within the testing device 100 to automatically rerun the automated test case 212 as shown in FIG. 2.

FIG. 6 illustrates an activated toolbar interface 208. Furthermore, in FIG. 6 the effect of selecting Add Verification 504 on toolbar interface 208 as described in FIG. 5 is illustrated within the window 604. In addition, the effect of selecting Add Editable Verification button 506 in FIG. 5 is illustrated within the window 606 in FIG. 6. The View Verification button 508 in FIG. 5 is illustrated as an open window 608 in FIG. 6. The Add Shared Data button 510 is illustrated as a window 610 in FIG. 6. Each one of the windows 604-610 maybe opened when a user points and selects a button within the toolbar interface 208. The window 604 displays text that has been highlighted by a user on the web page 600 and may be required information that must be shown within a particular test case. The window 604 contains an accept verify keyword button that allows the user to accept what is displayed in window 604 as mandatory content within any web-page in which the particular test case is performed. The window 606 allows a user to manually enter in data that should be either positively within a particular web page or must not be there or else an error will be displayed. The window 608 displays a summary of keywords to be added prior to acceptance by a user. The window 610 allows a user to enter shared data that may be ignored because it is dynamic and constantly changing as previously described with respect to button 510 in FIG. 5.

FIG. 7 illustrates an exemplary user interface 700 for initiating a test case within the testing device 100 according to one exemplary embodiment. In FIG. 7, a window 704 indicates a plurality of test cases and a priority associated with each test case that can be run within a testing device 100. A series of selection choices 702 allows a user to indicate when a test case may be performed. Also shown in FIG. 7 is the toolbar interface 208 as previously described in FIG. 5.

FIG. 8 illustrates an exemplary user interface 800 for re-using user profile. In FIG. 8, user profile information 802 can be manually selected or entered as well as dynamically re-used (e.g., by selecting a scrolled choice within the user profile information 802 or by selecting a clone user button 804) so that a user does not have to re-enter or recreate a user profile for every single test case. As such, the exemplary user interface 800 shown in FIG. 8 may allow a user to save time when manually creating a new test case. The clone user button 804 may allow a user to quickly duplicate a particular test case profile (e.g., a test case profile may include details such as name, address, and access privileges of a particular type of user, such as a buyer or seller on a commerce website) that has been previously created for a particular user. A user creation utility 806 may allow a user to create a new user profile by manually entering information. Also shown in FIG. 8 is the toolbar interface 208 as previously described in FIG. 5.

Figure 9:
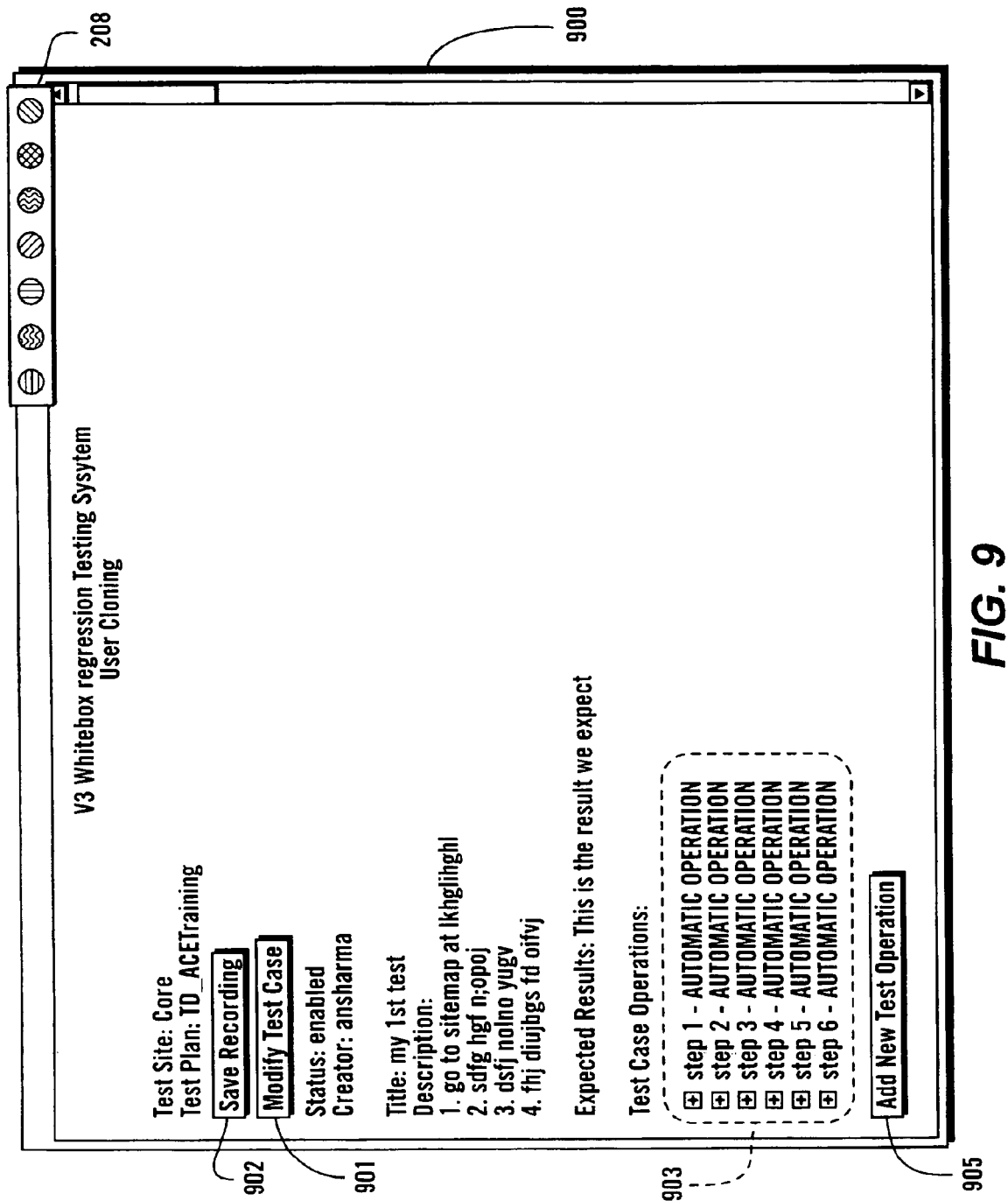
FIG. 9 is a user interface diagram illustrating an exemplary user interface (UI) for editing a test case, according to one exemplary embodiment.

FIG. 9 illustrates an exemplary user interface 900 for editing a test case ... In FIG. 9 a modify test case option is shown as 901, which allows a user to modify operations within a test case that has been recorded as shown in 903. The test case operations shown in 903 may be performed within an automated test case 212 (as shown in FIG. 4) and may be executed by a state machine 418 within a hosting server 110 according to one embodiment. The exemplary user interface in FIG. 9 also illustrates a Save Recording button 902 once a user is satisfied with the current test case (e.g., activating the Save Recording button 902 may signal a transfer of the representations 114A-B, and 116A-B to the storage device 112 within the hosting server 110 in one embodiment). Also, an Add New Test Operation is shown in 905, which allows a user to dynamically add additional operations to a particular test case.

FIG. 10 illustrates a bug report generated by a testing device 100 (as shown in FIG. 1), according to one exemplary embodiment. In FIG. 10, a summary of the bug report 1000 is shown at the top as 1004. The differences between the expected result and the generated result are shown in detail in a detailed difference view 1002. In one embodiment, when a user selects (e.g., by using a mouse) one of the differences within the detailed difference view 1002, a difference view 1100 may be generated as shown in FIG. 11 that graphically displays the particular error selected within the detailed difference view 1002 as shown in FIG. 10.

FIG. 11 illustrates a difference view 1100 generated by a testing device 100 (as shown in FIG. 1), according to one exemplary embodiment. In FIG. 11 the difference view 1100 includes a delta view 1101 showing the differences between the expected view and the view that has been generated by the current test case. The delta view 1101 illustrates the delta, or difference, between the expected result and the current result for a particular test case using strike-through and underline to clearly show the differences between the expected result and the current result.

FIG. 12 shows a diagrammatic representation of machine in the exemplary form of a computer system 1200 within which a set of instructions, for causing the machine to perform any one or more of the methodologies discussed herein, may be executed. In various embodiments, the machine operates as a standalone device or a connected (e.g., networked) device, coupled to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular (or mobile) telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processor 1202 (e.g., a central processing unit (CPU), a graphics processing unit (GPU) or both), a main memory 1204 and a static memory 1206, which communicates with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media. The software 1224 may further be transmitted or received over a network 104 via the network interface device 1220. In one embodiment, the computer system 1200 may be the state machine 218 in FIG. 2. In another embodiment, the computer system 1200 may be the state machine 318 in FIG. 3 or the state machine 418 in FIG. 4.

While the machine-readable medium 1222 in FIG. 12 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The term "machine-readable medium" shall accordingly be taken to include, but not be limited to, solid-state memories, optical and magnetic media, and carrier wave signals.

Figure 13:
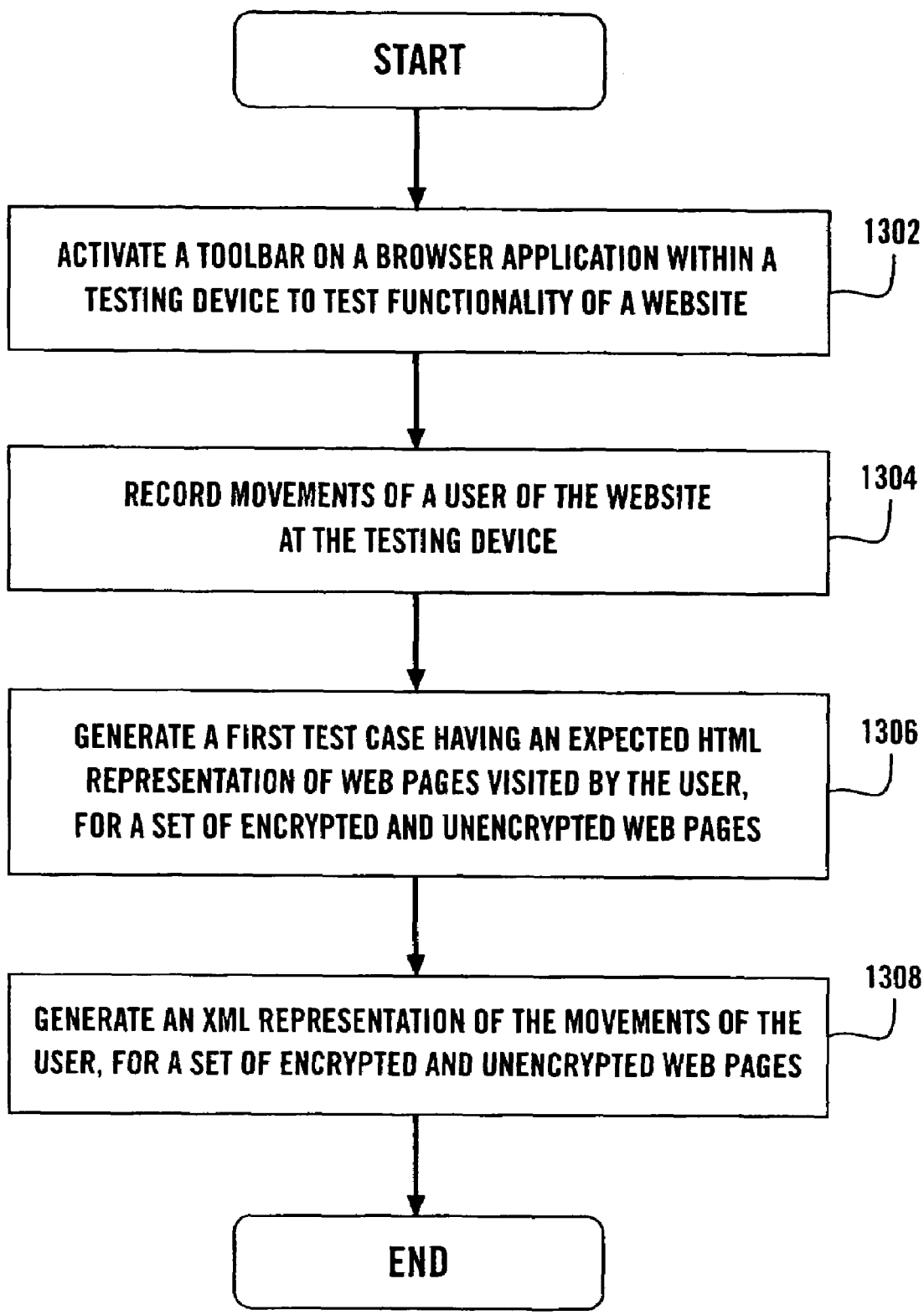
FIG. 13 is a flow chart illustrating a process flow for creating a test case within a testing device, according to one exemplary embodiment.

FIG. 13 illustrates a process flow for creating a test case within a testing device 100, according to one exemplary embodiment. In operation 1302, a toolbar may be activated on a browser application within a testing device to test a functionality of a website. In one embodiment, the toolbar interface 208 within the testing device 100 may be activated within a browser application 216 as illustrated in FIG. 2. In operation 1304, movements (or other operations), of a user of the website at the testing device, are recorded. In one embodiment, a testing device 100 as shown in FIG. 1 may be used to record the movements or operations of the user. In operation 1306, a first test case may be generated having an expected HTML representation of web pages visited by the user. In one embodiment, the first test case may be a manual test case 200 that is executed and transformed into an automated test case 212 within a testing device 100 as shown in FIG. 2. In operation 1308, an XML representation may be generated based on the movements or operations of the user for a set of encrypted and unencrypted websites. In one embodiment, the XML representations are representations 114A associated with encrypted web pages visited by the user, and representations 116A associated with unencrypted web pages visited by the user.

Figure 14:
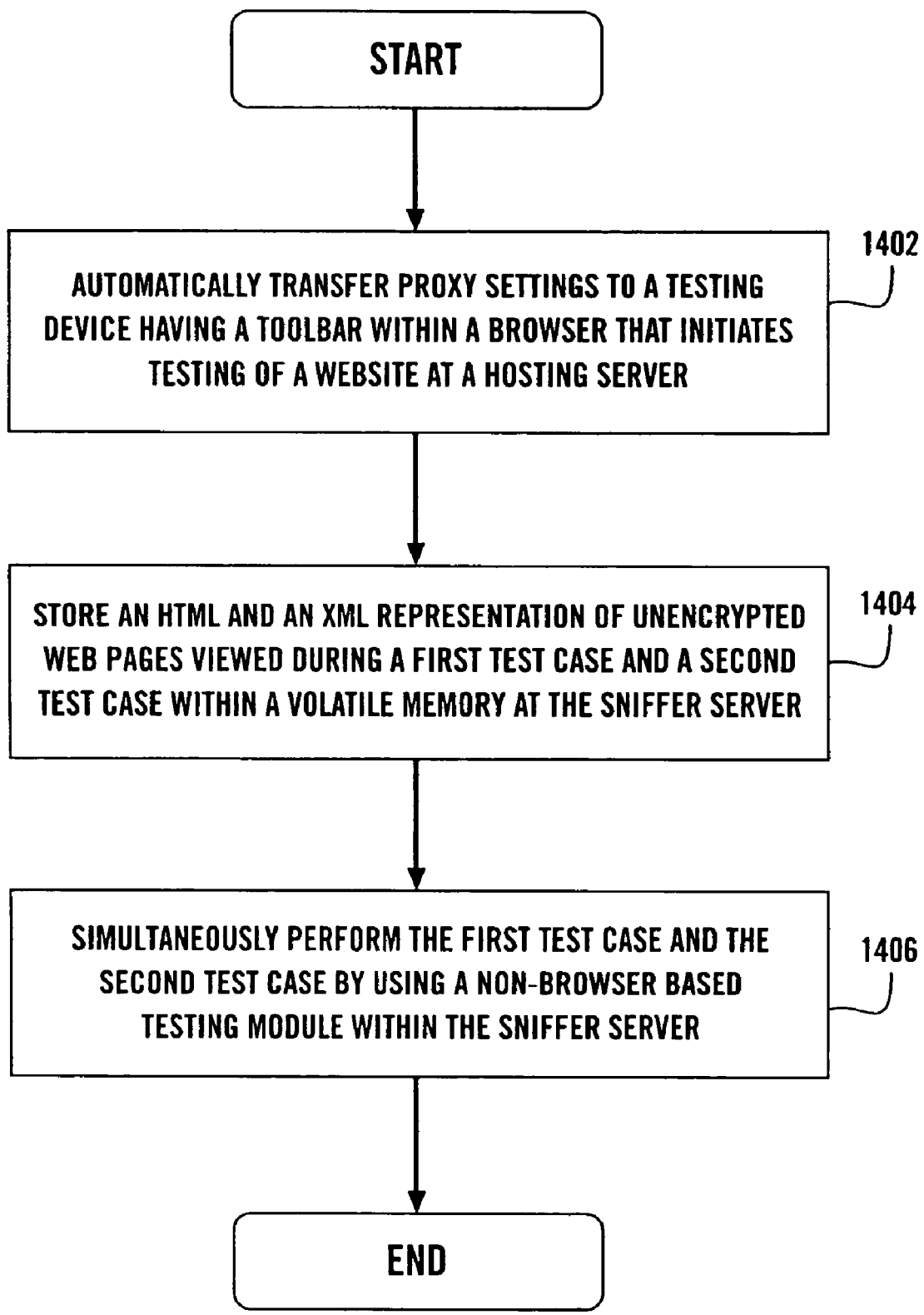
FIG. 14 is a flow chart illustrating a process flow within a sniffer server to simultaneously perform multiple test cases, according to one exemplary embodiment.

FIG. 14 illustrates a process flow within a sniffer server to simultaneously perform multiple test cases, according to one exemplary embodiment. In operation 1402, proxy settings are automatically transferred to a testing device having a toolbar interface within a browser that may be used to initiate testing of a website at a hosting server. In one embodiment, a proxy generator 302 within the sniffer server 106 as shown in FIG. 3 may be used to generate and transfer the proxy settings to the testing device 100 from the sniffer server 106. In one embodiment, the toolbar interface may be activated on a browser application within the testing device to test the functionality of the website.

In operation 1404, HTML and XML representations of unencrypted web pages viewed during a first test case and a second test case are stored within a memory (e.g., a volatile memory) at the sniffer server. In one embodiment, these representations are received from the output generator 206 within the testing device 100 as shown in FIG. 2. The testing device 100 as shown in FIG. 2 may create the second test case by editing (e.g., either manually or automatically through a macro) the first and the second XML representations (e.g., 114A and 116A) and inserting a range of values for various iterations of the second test case (e.g., so as to vary each and every iteration of the second test case). In one embodiment, the second test case uses at least a portion of data from the first test case without manual entry by the user. In one embodiment, the second test case uses at least a portion of data from the first test case without manual entry by the user. In another embodiment, the testing device 100 automatically tests programming code within a new version of the website that may be common with programming code within at least one prevision version of the website using the second test case.

In operation 1406, the first test case and the second test case are simultaneously performed by using a non-browser based testing module within the sniffer server. In one embodiment, the first test case and the second test case are two different ones of the manual test case 200. In another embodiment, the first test case and the second test case are automated tests cases associated with different revisions of the same website.

Thus, a method and system to automate software testing using sniffer side and browser side recording and a capture toolbar interface have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method within a sniffer server, the method including:
    automatically transferring proxy settings to a testing device having a toolbar interface within a browser that initiates testing of a website at a hosting server;
    storing an HTML and an XML representation of unencrypted web pages viewed during a first test case and a second test case within a memory at the sniffer server, the second test case being created by manually editing the XML representation of unencrypted web pages viewed during the first test case and inserting a range of values for various iterations of the second test case, the second test case further using at least a portion of data from the first test case without manual entry by a user;
    simultaneously performing the first test case and the second test case by using a non-browser based testing module within the sniffer server; and
    transferring the HTML and the XML representation of unencrypted web pages viewed during the first test case and the second test case to a storage device within the hosting server when the first test case is terminated.

2. The method of claim 1, further including adding to the first test case at least one verification keyword that is selected by a user.

3. The method of claim 1, further including adding to the first test case at least one variable database value for verification that is selected by a user.

4. The method of claim 1, further including applying the first test case to a new version of the website to automatically test programming code within the new version that is common with programming code within at least one previous version of the website.

5. A machine-readable medium storing a set of instructions that, when executed by the machine, cause the machine to perform a method, the method including:
    automatically transferring proxy settings to a testing device having a toolbar interface within a browser that initiates testing of a website at a hosting server;
    storing an HTML and an XML representation of unencrypted web pages viewed during a first test case and a second test case within a memory at a sniffer server, the second test case further using at least a portion of data from the first test case without manual entry by a user;
    adding to the first test case at least one variable database value for verification that is selected by a user;
    simultaneously performing the first test case and the second test case by using a non-browser based testing module within the sniffer server; and
    transferring the HTML and the XML representation of unencrypted web pages viewed during the first test case and the second test case to a storage device within the hosting server when the first test case is terminated.

6. The machine-readable medium of claim 5, further including adding to the first test case at least one verification keyword that is selected by a user.

7. The machine-readable medium of claim 5, wherein the second test case is created by manually editing the XML representation of unencrypted web pages viewed during the first test case and inserting a range of values for various iterations of the second test case.

8. The machine-readable medium of claim 5, further including applying the first test case to a new version of the website to automatically test programming code within the new version that is common with programming code within at least one previous version of the website.

\* \* \* \* \*

UNITED STATES PATENT AND TRADEMARK OFFICE
CERTIFICATE OF CORRECTION

PATENT NO. : 7,617,486 B2
APPLICATION NO. : 10/969736
DATED : November 10, 2009
INVENTOR(S) : Anoop Sharma et al.

It is certified that error appears in the above-identified patent and that said Letters Patent is hereby corrected as shown below:

On Sheet 8 of 14, in Figure 8, line 1, delete "Sysytem" and insert -- System --, therefor.

On Sheet 8 of 14, in Figure 8, line 4, delete "Sysytem" and insert -- System --, therefor.

On Sheet 9 of 14, in Figure 9, line 1, delete "Sysytem" and insert -- System --, therefor.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO.        : 7,617,486 B2                                             Page 1 of 1
APPLICATION NO.   : 10/969736
DATED             : November 10, 2009
INVENTOR(S)       : Sharma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1422 days.

Signed and Sealed this

Nineteenth Day of October, 2010

David J. Kappos
*Director of the United States Patent and Trademark Office*